Feb. 18, 1941.  O. F. PEREZ  2,232,469
ANTIGLARE APPARATUS
Filed Aug. 22, 1939
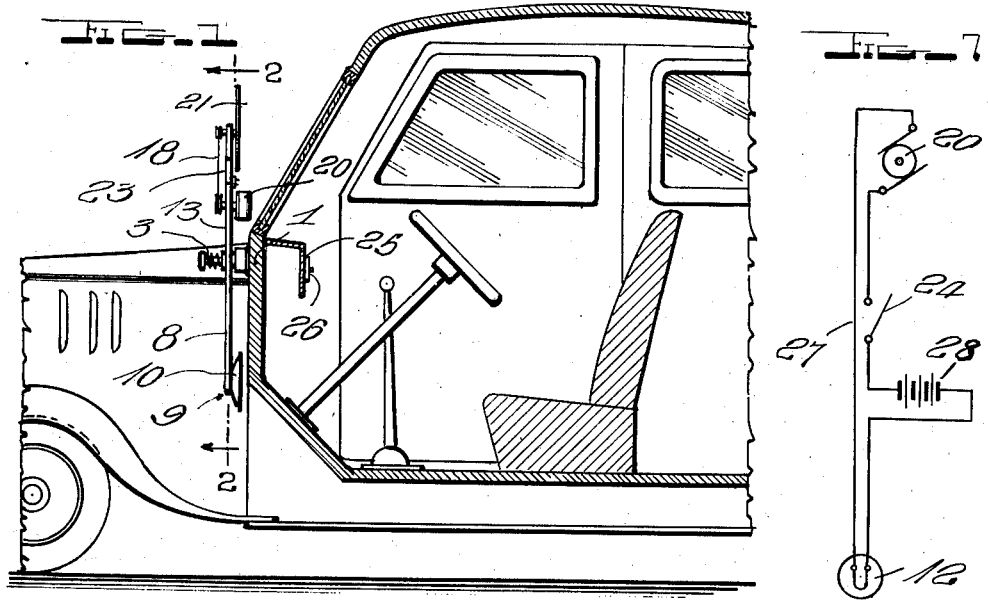
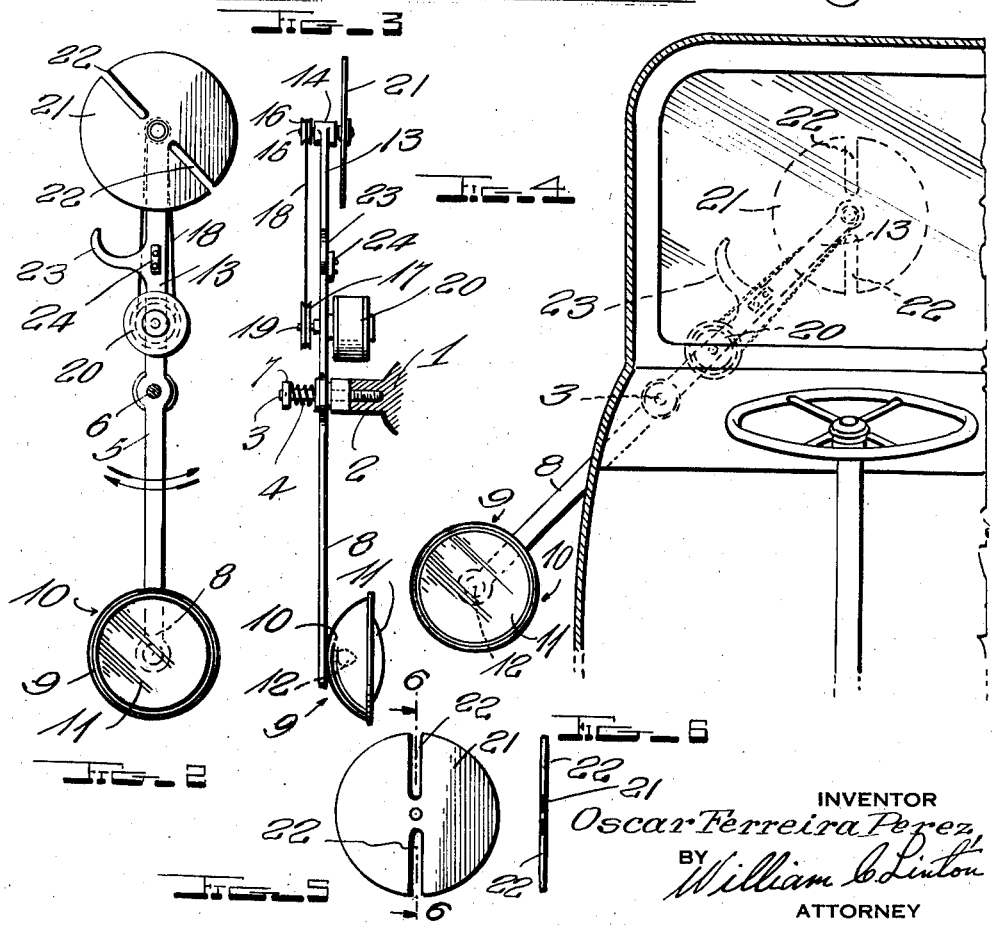
INVENTOR
Oscar Ferreira Perez
BY
William C. Linton
ATTORNEY Patented Feb. 18, 1941

2,232,469

UNITED STATES PATENT OFFICE 2,232,469

ANTIGLARE APPARATUS

Oscar Ferreira Perez, Habana, Cuba

Application August 22, 1939, Serial No. 291,415
In Cuba July 20, 1939

4 Claims. (Cl. 296—97)

The present invention relates to apparatus for diminishing the glare effect produced by a beam of light directed to the human eye, and is more particularly concerned with reducing the light passing from an automobile headlight to the eyes of a driver of an approaching vehicle.

The human eye retina will maintain an impression formed thereon by a ray of light for an average period of one-half second, and as the iris of the eye does not begin to close and reduce the exposed area of the retina until after a relatively stronger light ray has made its impression upon the retina, a temporary blinding of the eye results as the impression persists. In driving an automobile at night time, the sudden beam of light focussed upon the driver's eyes by an approaching vehicle is retained by the retina until and even after the iris has readjusted itself to minimize the amount of light passing through to the retina. The driver is therefore temporarily blinded and can neither see the approaching vehicle nor the road surface in front of him and as a result thereof, the dangers of night driving are increased, as has been evidenced by numerous collisions in the past.

The principal object of the present device is to provide an apparatus whereby the driver of a vehicle can reduce the power of the light beam from an approaching vehicle and, at the same time, maintain his vision in the path into which he is proceeding.

A further object of the present invention is to provide an antiglare apparatus which is normally positioned upon a vehicle out of the line of vision of the driver thereof and which can be easily and readily positioned when necessary for reducing the strength of a beam of light directed towards the driver's eyes.

Another important object of the present invention is to provide a simple and economically produced antiglare apparatus which can be operated by one hand with a minimum amount of effort.

Further objects of the present invention will be in part pointed out and in part obvious from the following description of the accompanying drawing.

In the drawing:

Fig. 1 is a side elevation of a vehicle having an apparatus according to the present invention mounted thereon.

Fig. 2 is an enlarged rear view of the present apparatus taken on line 2—2 of Fig. 1.

Fig. 3 is a side view of the apparatus shown in Fig. 2 mounted upon a support.

Fig. 4 is a rear view of the antiglare apparatus mounted upon a vehicle and positioned for use.

Fig. 5 is a front view of a disc forming one of the elements of the present invention.

Fig. 6 is a side cross sectional view taken on line 6—6 of Fig. 5, and

Fig. 7 is a diagrammatic view of the electrical system for the present apparatus.

Referring now more particularly to the accompanying drawing wherein like reference characters designate similar parts thereof and in which one manner of carrying out the present invention is disclosed, numeral 1 refers to the body of a motor vehicle having a projecting portion 2 connected thereto which supports an axle 3. A rod 5 having a centrally located opening 6 is pivotally mounted upon said axle 3 by inserting said axle through opening 6 and it is retained thereon by a spring 4 bearing thereagainst, which spring 4 is retained upon the axle by a nut 7. The lower end portion 8 of rod 5 has firmly mounted thereon a headlight 9 composed of a reflector casing 10, lens 11 and a lamp 12.

The opposite portion 13 of rod 5 has a tubular bearing 14 formed upon the end thereof through which extends a rotatable axle 15. Said axle 15 has a pulley 16 fixedly mounted upon one end thereof, which pulley 16 is connected to a second pulley 17 by means of an endless belt 18. Said pulley 17 is mounted upon one end of the shaft 19 of an electric motor 20 carried by said rod 5. The opposite end of axle 15 has fixedly mounted thereon a disc 21 formed of an opaque material such as metal, for example. Said disc 21 has a pair of radially extending slots 22 formed therethrough which are substantially diametrically opposite to one another. Said upper portion 13 of rod 5 has a handle 23 formed extending therefrom at a point below disc 21.

As shown in Fig. 7 of the drawing, motor 20 has the poles thereof connected to an electrical circuit 27 in which is also positioned lamp 12. The circuit is fed an electrical current by any suitable current supplying source such as the automobile battery 28. Rod 5 has mounted thereon a switch 24, which switch is interposed within the electrical circuit for opening and closing the same as desired and is positioned upon rod 5 at a point adjacent handle 22. It is preferable that rod 5 be of a tubular construction whereby the wires of the electrical circuit may be positioned therein for protection and can extend from opening 6 through the body 1 of the vehicle to the dashboard 25 and connected to the electrical switch 26 thereon or direct to battery 28.

The switch 26 is, of course, connected to battery 28.

Opening 6 is positioned relative to shaft 5 in such a manner that when said shaft 5 is pivoted, disc 21 will be positioned directly between the beam of light from an oncoming vehicle headlight and the eyes of the driver of the vehicle carrying the present apparatus. At the same time, the portion 8 of rod 5 below opening 6 should be sufficiently long enough to cause headlight 9 to extend beyond the side members of the vehicle 1. Disc 21 and motor 20 which compose the substantial weights upon one side of opening 6 are positioned upon rod 5 in order that they may somewhat counterbalance the weight of headlight 9 upon the other portion of rod 5 and, yet at the same time, permit the weight of headlight 9 to cause the rod 5 to assume a substantially vertical position, whereby, the rod and its connected members are positioned along the side of the vehicle 1 out of the line of vision of the driver and without the possibility of approaching objects colliding with the members thereof, yet, permitting the apparatus to be positioned as disclosed in Fig. 4 by applying a slight pressure upon handle 23.

Immediately before the headlight beam of an approaching vehicle shines into the eyes of the driver of the vehicle having the present apparatus mounted thereon, the driver grasps handle 23, forcing portion 13 of rod 5 to his right, and, at the same time, closing switch 24, whereupon motor 20 will be placed in operation, driving belt 18 and consequently pulley 16 by means of pulley 17, and, at the same time, lighting bulb 12 of searchlight 9. Pulley 16 rotates disc 21 which has been positioned by the movement of shaft 5 into the path of the aforementioned headlight beam and directly in front of the eyes of the driver. The beam of light from the approaching vehicle will be intercepted by the opaque disc 21, thereby shutting out the incoming light rays from the driver's path of vision. Disc 21 is rotated by axle 15 sufficiently fast for the slots 22 to repeatedly pass in front of the driver's eyes, whereupon, the retina of the driver's eyes can receive an image of the road in front of the vehicle from time to time, while the solid portions of the disc close out the principal portion of the light waves. The retina will retain this impression for approximately one-half second and the impressions will be presented to the eye sufficiently often to give the driver an impression of continued vision thereahead. The motor can be adjusted to give disc 21 the number of rotations which in each instance is found desirable. The disc is sufficiently large to completely intercept the light rays of the approaching vehicle and the slots 22 are sized according to the number of slots provided, that is, a wide slot where only one is used, whereas, a narrow slot is used where a plurality of slots are formed in the disc. In this manner, the direct rays of light from the oncoming vehicle are temporarily intercepted without completely closing the driver's line of vision and, at the same time, permits the iris of the driver's eyes to adjust itself for restricting the light rays passing therethrough, whereby, the eye can adjust itself to the sudden increase in light rays without being blinded.

Simultaneous with the interception of the light rays from the oncoming vehicle, searchlight 9 illuminates the rear portion of the driver's vehicle and the portion of the road adjacent thereto, whereupon, the headlights of the oncoming car are supplemented in such a manner as to give the impression to the driver of the oncoming car that his headlights are not diminished in their power, as is the case when the rays of light from the approaching vehicle suddenly meet the rays of light of the driver's vehicle and illuminate previous dark portions of the immediate area, and thereby permits him to retain his previous perceptibility. After the approaching vehicle has passed, the driver can open switch 24, breaking the current supply to lamp 12 and motor 20 and, at the same time, release handle 23. Since opening 6 is somewhat above the center of gravity of the entire apparatus, head lamp 9 will swing to the right and position itself alongside of the vehicle and by means of rod 5, causes disc 21 to swing to the left out of the driver's line of vision. There, the apparatus will remain until again required.

The foregoing described apparatus is merely one way of carrying out the present invention. That is, the rotatable disc 21 can be operated independently of the head lamp 9 and, similarly, head lamp 9 may be operated independently of disc 21. The apparatus can be readily modified but such changes thereof as come within the scope of the appended claims are deemed to be a part of the present invention.

I claim:

1. An antiglare apparatus comprising a rod, an opaque disc rotatably mounted on said rod, means for rotating said disc, said disc having radially extending slots formed therethrough, a pivotal support for said rod and a counterweight formed by means for producing a ray of light and mounted upon said rod opposite said pivotal support to said disc.

2. An antiglare apparatus comprising a rod, an opaque disc rotatably mounted on said rod, means for rotating said disc, said disc having radially extending slots formed therethrough, a pivotal support for said rod connected thereto above the center of gravity of said rod and its connected members and a counterweight formed by means for producing a ray of light and mounted upon said rod opposite said pivotal support to said disc.

3. An antiglare apparatus comprising a rod, an opaque disc rotatably mounted on one end of said rod, said disc having radially extending slots formed therethrough, an electric motor connected to said disc for rotating the same, an intermediate pivotal support for said rod, a counterweight formed by an electric searchlight and mounted on the opposite end of said rod, an electric supply system having said searchlight and motor interposed therein and connected to a current supply and a switch mounted on said rod for opening and closing said circuit.

4. An antiglare apparatus for use upon motor vehicles comprising a disc having a pair of narrow spaced slots formed therein, means carried by said vehicle for rotating said disc, a counterweight formed by means for producing a ray of light, and means connected to said vehicle for supporting and positioning said disc and said counterweight either with the disc in front of the vehicle driver's eyes and the counterweight directing its light towards the rear side portion of the vehicle or both the disc and counterweight adjacent the side of the vehicle.

OSCAR FERREIRA PEREZ.